Figure 1:
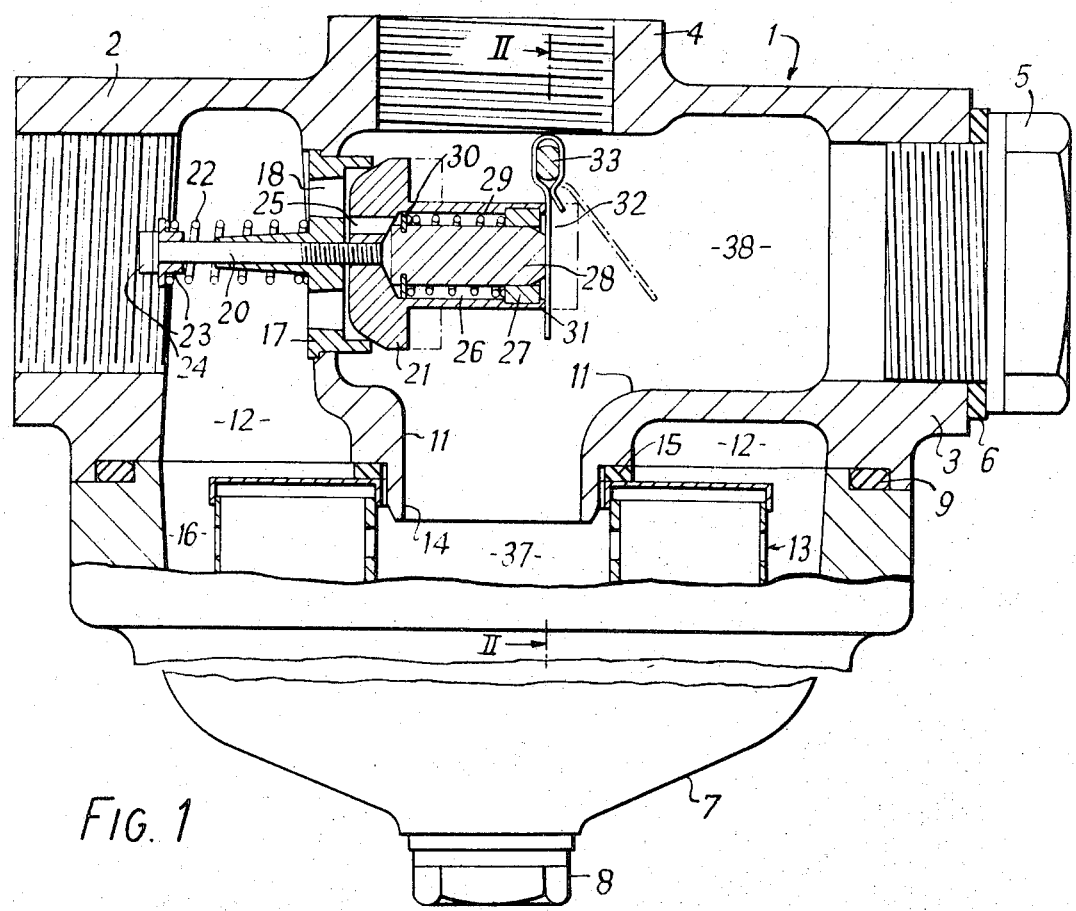

United States Patent [19]
Read

[11] 3,828,812
[45] Aug. 13, 1974

[54] PRESSURE-MONITORING RELIEF VALVE

[76] Inventor: Brian Read, 18 Wheatland Rd., Heswall, Wirral, England

[22] Filed: June 14, 1972

[21] Appl. No.: 262,879

[30] Foreign Application Priority Data
June 14, 1971 Great Britain.................. 27819/71

[52] U.S. Cl.................. 137/557, 116/70, 137/541, 137/544, 210/90
[51] Int. Cl.......................................... F16k 37/00
[58] Field of Search......... 116/70; 210/90; 137/224, 137/512.2, 524, 541, 551, 557, 614.16, 614.17, 544

[56] References Cited
UNITED STATES PATENTS

| | | | |
|---|---|---|---|
| 1,611,659 | 12/1926 | Malivert............................. | 116/70 |
| 2,678,134 | 5/1954 | Middleton........................... | 116/70 |
| 2,998,138 | 8/1961 | Mould et al. ....................... | 210/90 |
| 3,442,384 | 5/1969 | Downey et al........................ | 210/90 |
| 3,451,551 | 6/1969 | Sample et al........................ | 210/90 |
| 3,545,616 | 12/1970 | Aspinwall.......................... | 116/70 X |

Primary Examiner—William R. Cline
Assistant Examiner—George L. Walton
Attorney, Agent, or Firm—Lawrence Rosen; E. Janet Berry

[57] ABSTRACT

A pressure-monitoring relief valve for a filter comprises a pressure-monitoring member slidable in a bore in a relief valve member against a spring in response to differential pressure between its ends, one of which bears against a lever on a shaft carrying an indicator. The relief valve member is applied against its seat by a further spring. The indicator gives a progressive external indication of increasing pressure drop across the filter and a further external indication movement when the relief valve opens due to the filter being clogged.

7 Claims, 2 Drawing Figures

PRESSURE-MONITORING RELIEF VALVE

The present invention relates to pressure-monitoring relief valves which give an external indication of the instantaneous pressure differential across the valve.

According to the present invention, there is provided a pressure-monitoring relief valve comprising a valve seat, a valve member resiliently applied against the valve seat, a pressure-monitoring member mounted for sliding movement against a resilient bias in a bore in the relief valve member, and means for providing an external indication of the position of the pressure-monitoring member relative to the relief valve seat.

The pressure-monitoring relief valve may be used as a combined monitor and relief valve for a filter for fluids. As the filter medium of a filter becomes progressively charged with impurities removed from the fluid passing through the filter medium, the pressure differential across the filter medium required to maintain a given flow through the filter medium increases until a value may be reached at which the efficiency of the overall system is reduced considerably and in some cases dangerously. For example, where the filter medium is inserted in the flow path from a reservoir to the inlet of a pump, an excessive pressure differential across the filter medium may reduce the supply to the pump to such an extent that cavitation may occur which in turn may lead to damage to the pump as a result of lack of lubrication where the fluid being pumped lubricates working parts of the pump and to failure of output from the pump.

Pressure-monitoring relief valves for filters are known from U.S. Pat. Specifications Nos. 3,150,633 and 3,501,005. In both these known constructions, the relief valve member also acts as a monitoring member in an attempt to give a progressive indication of increasing pressure drop across the filter element. The relief valve member moves as a close sliding fit in a bore against the action of a spring. When the pressure drop reaches the value at which the relief valve is to open, the valve member emerges from the end of the bore to leave an annular valve opening of limited size. The design of these known valves involves a compromise since the flow cross-section of the annular opening depends on the diameter of the bore. Increasing the diameter of the bore thus increases the size of the annular opening but at the same time also increases the risk of leakage of fluid, this leakage fluid by-passing the filter element even though the valve is 'closed'.

The pressure-monitoring relief valve according to the invention avoids the need for such compromise since the relief valve member can be made as large as is desired and subjected to the bias of a large spring while the pressure-monitoring member can be of appropriately smaller size and biased by a separate, smaller spring. At the same time, the movement of the external indicating means represents the sum of the individual movements of the relief valve member and monitoring member. Thus, when the relief valve opens, there is a clear, additional movement of the external indicator as compared with the known valves.

In one preferred form of construction, the pressure-monitoring member bears against an arm carried by a shaft passing outwards through a wall to carry an external indicating device such as a pointer or marked disc. Progressive movement of the pressure-monitoring member in response to increasing pressure across the relief valve will produce corresponding progressive rotation of the shaft and thus of the external indicator. Preferably, both ends of the shaft extend through wall portions into the atmosphere, the diameters of the portions passing through the walls being equal. This ensures that there is no net force acting on the shaft in the axial direction due to fluid pressure between the walls.

Figure 2:
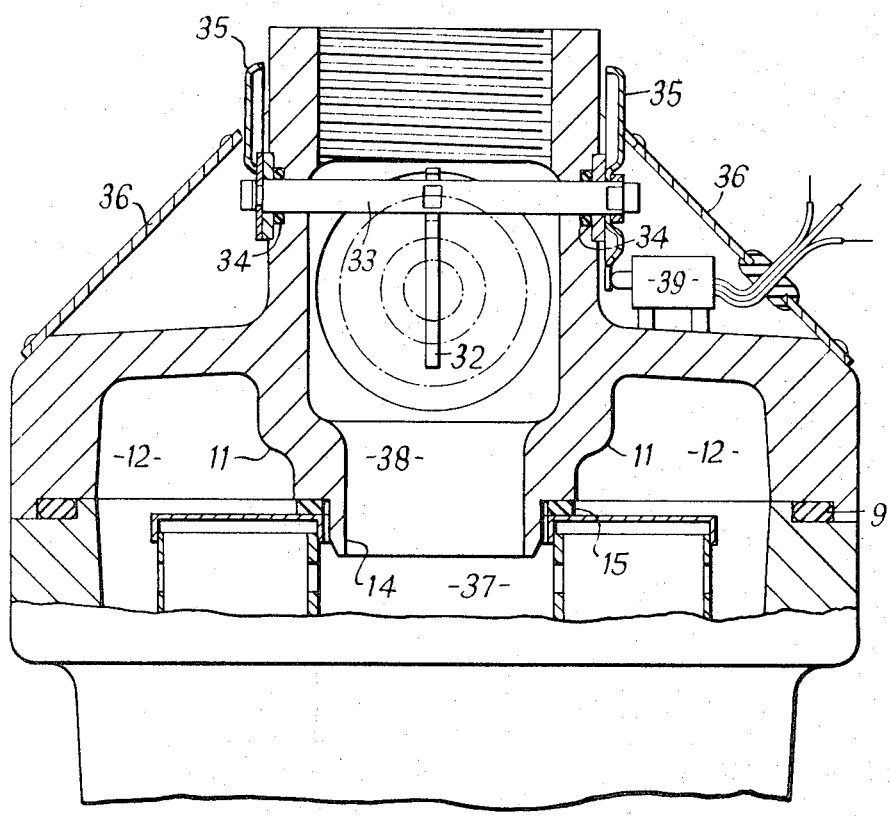

An embodiment of the invention will now be described by way of example with reference to the accompanying drawings in which:

FIG. 1 is an elevational view of the filter assembly with the upper part shown in section, and FIG. 2 is the upper part of a corresponding view taken at right angles to FIG. 1 on the line II—II of FIG. 1.

The filter assembly shown in the drawings comprises a cast body 1 having a tapped inlet pipe connection 2 and two alternative outlet connections 3 and 4 to allow for different mounting requirements. Whichever of the outlet connections 3 and 4 is not used is closed by a plug 5 and sealing washer 6.

A filter bowl 7 having a bottom drain plug 8 has flange portions (not shown) at its upper end bolted to corresponding flange portions of the body 1. An O-ring 9 is clamped in an annular space between the stepped mating portions of the body 1 and bowl 7 to provide a seal.

A partition 11 formed integrally in the body 1 separates the inlet 2 from the outlets 3 and 4 and defines an annular distribution channel 12 for distributing incoming fluid flow from the inlet 2 over the whole circumference of a cylindrical filter element 13 mounted in the bowl 7 with its upper end engages over a depending spigot portion 14 of the partition 11. A gasket 15 seals the upper end of the filter element 13 to the partition 11. A clearance is left between the cylindrical outer surface of the filter element 13 and the inner wall surface of the bowl 7 to define an annular space 16 providing direct access for fluid to be filtered to flow from the distributing space 12 over the whole active surface area of the filter element 13.

Directly opposite the inlet 2, the vertical portion of the partition 11 is formed with a stepped bore receiving a correspondingly flanged valve seat member 17 formed with a ring of flow passages 18 and carrying a central projection 19 defining a guide bore for a guide bolt 20, the threaded end of which is engaged in a screw-threaded bore in a relief valve member 21. The relief valve member 21 is resiliently held on its valve seat 17 by a spring 22 surrounding the projecting portion 19 and bearing at one end against valve seat member 17 and at its other end against a washer 23 under the head 24 of the bolt 20.

The relief valve member 21 is formed with a passage 25 leading into a bore 26 having an enlarged diameter end portion receiving a guide collar 27 for a pressure-monitoring plunger 28 which is urged to the left (FIG. 1) by a spring 29 acting between the collar 27 and a circlip 30 engaged in a groove in the plunger 28. The collar 27 is retained in position against the pressure of the spring 29 by peening over the edge of the bore 26 at 31.

The pressure-monitoring plunger 28 bears against an arm 32 mounted on a cross-shaft 33, both ends of which pass through wall portions of the body 1 to the outside. O-rings 34 act as seals with respect to the shaft ends to prevent loss of fluid (or ingress of air and contaminants). Each end of the shaft 33 carries an indicator disc 35 bearing coloured markings arranged to give a progressively changing appearance as the pressure differential across the relief valve increases.

In operation, fluid to be filtered, for example oil from a reservoir supplying a pump which in turn supplies a hydraulic system, enters the filter assembly through the connector 2, is distributed through the space 12 to the clearance 16 around the filter element 13, passes through the filter medium of the latter (for example a pleated paper element) into the interior 37 of the filter element 13 and thence into the chamber 38 within the partition 11 and on to the outlet 4 (or 5) to the pump inlet.

The inlet pressure is applied to the left-hand end of the plunger 28 (as seen in FIG. 1) through the passages 18 and 25 while the outlet pressure is applied directly to the right-hand end of the plunger 28. Accordingly, the pressure differential across the filter element 13 is applied to the monitoring plunger 28 to exert a force thereon against the spring 29. Thus, as the pressure differential increases, the plunger 28 moves to the right, thereby rotating the arm 32, shaft 33 and discs 35.

Accordingly, by suitably arranging the markings on the discs 35, for example by arranging coloured sectors of the disc, the state of contamination of the filter medium is readily observed from outside simply by observing the colour of the exposed parts of the discs 35, the remainder of the discs being hidden by a casing portion, for example that shown at 36.

Eventually, the degree of contamination of the filter medium will be such that the pressure differential across it could so reduce the flow rate through the filter as to endanger other components in the system. The loading of the spring 22 is chosen so that at this value, the back pressure moves the relief valve member 21 itself away from its seating 17 to provide direct communication from the inlet 2 through the passage 18 to the chamber 38 and thence to the outlet 4 (or 5). This movement of the relief valve member, to the position shown in broken lines in FIG. 1, causes the edge 31 to move the arm 32 to the end position shown in broken lines in FIG. 1. Markings on the disc 35 will then clearly indicate that the pressure drop within the filter is such that the relief valve is opened. Further, the discs 35 (or some other member carried by the shaft 33) can be arranged to operate a microswitch 39 under these conditions which may be of the change-over type arranged to switch off a green light and switch on a red light when the relief valve has opened or has opened fully.

The pressure-monitoring relief valve described above has relatively few portions requiring accurate machining. The plunger 28 may be cut from commercially available pre-ground bar stock and the collar 27 may be a commercially available bush. The assembly consisting of the valve seating 17 and the parts carried by the latter may be standardised for a variety of different sizes of filter assembly; in the large sizes, several relief valve assemblies may be mounted side by side to act in parallel. In this case, only one of them need co-operate with a shaft and arm system.

I claim:

1. A pressure-monitoring relief valve comprising a valve seat having an opening therethrough, a relief valve member cooperating with said valve seat to close said opening when said valve member is applied against said valve seat, said relief valve member having a passage therethrough, a pressure-monitoring member movable in said passage over a range of positions in response to changes in fluid pressure between opposite sides of said relief valve, said pressure-monitoring member closing said passage in all positions in said range, first resilient means urging said relief valve member in closing direction towards said valve seat, second resilient means acting between the said pressure-monitoring member and said relief valve member to urge said pressure-monitoring member to move in said closing direction in said passage, a generally hollow housing wherein said valve seat, said relief valve member and said pressure monitoring member are disposed, and indication means cooperating with said pressure-monitoring member for continuously providing an indication of the position of said pressure-monitoring member, said indication means including a portion within said housing and an external portion outside of said housing connected to said internal portion, said indication means being operatively positioned such that said external portion is operable by displacement of said pressure-monitoring member when said relief valve member is closed, said external portion being operable to a predetermined position to indicate opening of said relief valve member through combined movement of both said pressure-monitoring member and said relief valve member.

2. The relief valve of claim 1 in which said passage in said relief valve member includes a bore constituting at least part of said passage and said pressure-monitoring member is slidable in said bore while obturating said bore.

3. The relief valve of claim 2 in which said indication means also includes a shaft mounted for angular movement about the axis thereof, said internal portion including an arm carried by said shaft and contacting an end portion of said pressure-monitoring member that projects outside of said bore to be positively moved by said pressure-monitoring member and in turn angularly moved said shaft, said external portion including a visual indicating element mounted on said shaft.

4. The relief valve of claim 3 in which each end of said shaft extends through respective wall portions of said housing, the diameters of said shaft portions passing through said wall portions being equal.

5. The relief valve of claim 1 in which said indication means also includes a shaft mounted for angular movement about the axis thereof, said internal portion including an arm carried by said shaft and contacting said pressure-monitoring member to be positively moved by the latter and in turn angularly move said shaft, said external portion including a visual indicating element mounted on said shaft for positive movement therewith.

6. The relief valve of claim 5 in which each end of said shaft extends through respective wall portions of said housing, the diameters of said shaft portions passing through said wall portions being equal.

7. The relief valve of claim 5 in which the arm of the indication means engaged by the pressure-monitoring member is moved by the relief valve member when the latter in moving off of said valve seat moves the pressure-monitoring member whereby said indication means is operated to show that the relief valve is open.

* * * * *